United States Patent

Bonnet et al.

[11] Patent Number: 6,024,877
[45] Date of Patent: Feb. 15, 2000

[54] PROCESS AND INSTALLATION FOR THE TREATMENT OF EFFLUENTS LOADED WITH ORGANIC MATERIALS

[75] Inventors: Jean Bonnet, Angers; Jean Noel Cronier, Saint Briac Sur Mer; Yannick Juhere, Cancale, all of France

[73] Assignee: Vaslin Buscher, Chalonnes Sur Loire, France

[21] Appl. No.: 09/097,051

[22] Filed: Jun. 15, 1998

[30] Foreign Application Priority Data

Jun. 13, 1997 [FR] France ................................ 97 07547

[51] Int. Cl.⁷ ............................................. C02F 3/02
[52] U.S. Cl. .......................... 210/617; 210/621; 210/622; 210/629
[58] Field of Search ...................... 210/617, 621, 210/622, 150, 151, 195.1, 202, 220, 257.1, 258, 259, 604, 629

[56] References Cited

U.S. PATENT DOCUMENTS

| | | | |
|---|---|---|---|
| 2,308,866 | 1/1943 | Dekema | 210/617 |
| 3,429,806 | 2/1969 | Carter et al. | 210/621 |
| 3,920,550 | 11/1975 | Farrel, Jr. et al. | 210/195.1 |
| 4,070,292 | 1/1978 | Adams | 210/195.1 |
| 4,193,873 | 3/1980 | Thrasher | 210/195.1 |
| 4,251,359 | 2/1981 | Colwell et al. | 210/622 |
| 4,793,929 | 12/1988 | Kickuth et al. | 210/617 |
| 4,826,601 | 5/1989 | Spratt et al. | 210/617 |
| 4,961,854 | 10/1990 | Wittmann et al. | 210/621 |
| 5,102,548 | 4/1992 | Baxter | 210/621 |
| 5,228,996 | 7/1993 | Lansdell | 210/621 |
| 5,888,394 | 3/1999 | Jan | 210/621 |

FOREIGN PATENT DOCUMENTS

| | | |
|---|---|---|
| 2 422 602 | 11/1979 | France . |
| 3446401 | 6/1986 | Germany . |
| 43 41 591 | 8/1994 | Germany . |

Primary Examiner—Christopher Upton
Attorney, Agent, or Firm—Young & Thompson

[57] ABSTRACT

A process for treating effluents loaded with organic material, particularly wine-making effluents essential in the form of wash water, comprises pouring the effluents to be treated into a storage basin (1) and actuating a recirculation circuit (2) between this latter and an oxygenation reactor (3) for the effluents, actuating a superoxygenation device (4) when the volume of effluents stored is too great to avoid passing into anaerobic phase, then stopping the superoxygenation and maintaining the recirculation at a minimum level avoiding the passage into anoxia of the effluents, when these latter fulfill certain minimum pollution conditions. The effluents are poured over at least one purification body (5) and the purified effluents are withdrawn, until there is substantially nothing left but residual decantation sludges more or less mineralized, in the storage basin (1). These latter are treated to delay the organic components present and to lead to a substantially inert mineralized sludge.

8 Claims, 2 Drawing Sheets

PROCESS AND INSTALLATION FOR THE TREATMENT OF EFFLUENTS LOADED WITH ORGANIC MATERIALS

This application corresponds to French application 97 07547 of Jun. 13, 1997, the disclosure of which is incorporated herein by reference.

BACKGROUND OF THE INVENTION

The present invention relates to the field of treatment of effluents from processes producing liquid effluents loaded with organic materials and has for its object a process and an installation for the treatment of effluents of the type mentioned, particularly wine-making effluents essentially in the form of wash water.

DESCRIPTION OF THE RELATED ART

In the case of these latter effluents, the pollution generated is limited to relatively short time periods, during which the effluents are discharged in very great quantity and can constitute, because of this, a risk for the environment and the receiving medium.

Thus, according to the region, the year, and the wine-making processes used, it is necessary to provide for between 1 and 2 liters of polluted water generated per liter of wine produced.

The quantity of pollution is thus directly proportional to the quantity of wine produced.

When the wine maker uses less water, the pollution is more concentrated, but it must be considered that on the average the organic load is 12 grams of COD (chemical oxygen demand) per liter of wine.

Moreover, the daily quantity is quite variable and the washing which follows withdrawal can thus quadruple the mean daily production.

Wine-making effluents are relatively easily biodegradable, as they have low nitrogen and phosphorus contents, and have relatively low decantability associated with a large dissolved pollution.

To attempt to overcome the problems connected with the production of wine-making effluents in large quantities, different solutions have already been envisaged and in certain cases, put into practice.

Thus, it has been particularly proposed to spread directly said effluents over large areas of agricultural land and thereby to spread the impact of their distribution on the receiving medium, so as to reach an acceptable level of surface pollution.

However, this solution requires at the time and place of pollution quite large logistical and human means and cannot constitute a long term satisfactory solution, particularly as existing anti-pollution standards are not satisfied, which render this process non-conforming.

It has also been proposed to carry out simple aerated storage of these effluents, then to spread them after a sufficient period of storage.

Nevertheless, this solution encounters numerous problems of control of the pollution level and gives rise to long storage times in an effort to reach acceptable pollution levels.

Finally, there has also been proposed to provide conventional purification stations for use in the treatment of wine-making effluents.

However, this provision gives rise to costly overdimensioning of said stations to be able to respond to the peak pollution periods, without at the same time permitting reliable control of the increase in pollution level, and hence of the quality of the final effluents that are discharged, particularly in view of the continuous operation of these installations.

SUMMARY OF THE INVENTION

The problem posed by the present invention accordingly consists in overcoming the mentioned drawbacks and in designing a process and an installation for the treatment of effluents loaded with organic material, more particularly wine-making effluents, constituting a simple, suitable and efficacious solution, which is reliable and less costly as to time and permitting responding to the most strict regulatory requirements as to the discharged effluents.

To this end, the present invention has for its object a process for the treatment of effluents loaded with organic materials, particularly wine-making effluents essentially in the form of wash water, characterized in that it consists principally, for each treatment cycle, in pouring the effluents to be treated, as produced, into a storage basin and actuating a recirculation circuit between this latter and a reactor adapted particularly to oxygenate said effluents, in actuating a superoxygenation device integrated with the storage basin, when the volume of stored effluents is too great to avoid passing into anaerobic phase, this whilst maintaining the circulation through the reactor, then stopping the superoxygenation and maintaining the circulation at a minimum level avoiding the passage into anoxia of the effluents, when the latter achieves certain minimum pollution conditions, simultaneously and progressively pouring the effluents on at least one unit of purification solids and discharging the purified effluents, until leaving substantially only the residual sludge of decantation more or less mineralized, in the storage basin, and, finally, treating as desired at least a portion of these latter to suppress the organic components present and to lead to a substantially inert mineralized sludge.

The invention also has for its object an installation for the treatment of effluents loaded particularly with organic materials, particularly for practicing the process described above, characterized in that it is principally constituted by at least one storage basin suitable to the volume of effluents to be treated during a treatment cycle, at least one reactor connected to the storage basin or basins by a recirculation circuit, at least one superoxygenation device disposed in the or each storage basin, and one or several units of purification solids supplied with pretreated effluents from the reactor.

BRIEF DESCRIPTION OF THE DRAWINGS

The invention will be better understood from the following description, which relates to a preferred embodiment, given by way of non-limiting example, and explained with reference to the accompanying schematic drawings, in which.

DESCRIPTION OF THE PREFERRED EMBODIMENTS

Figure 1:
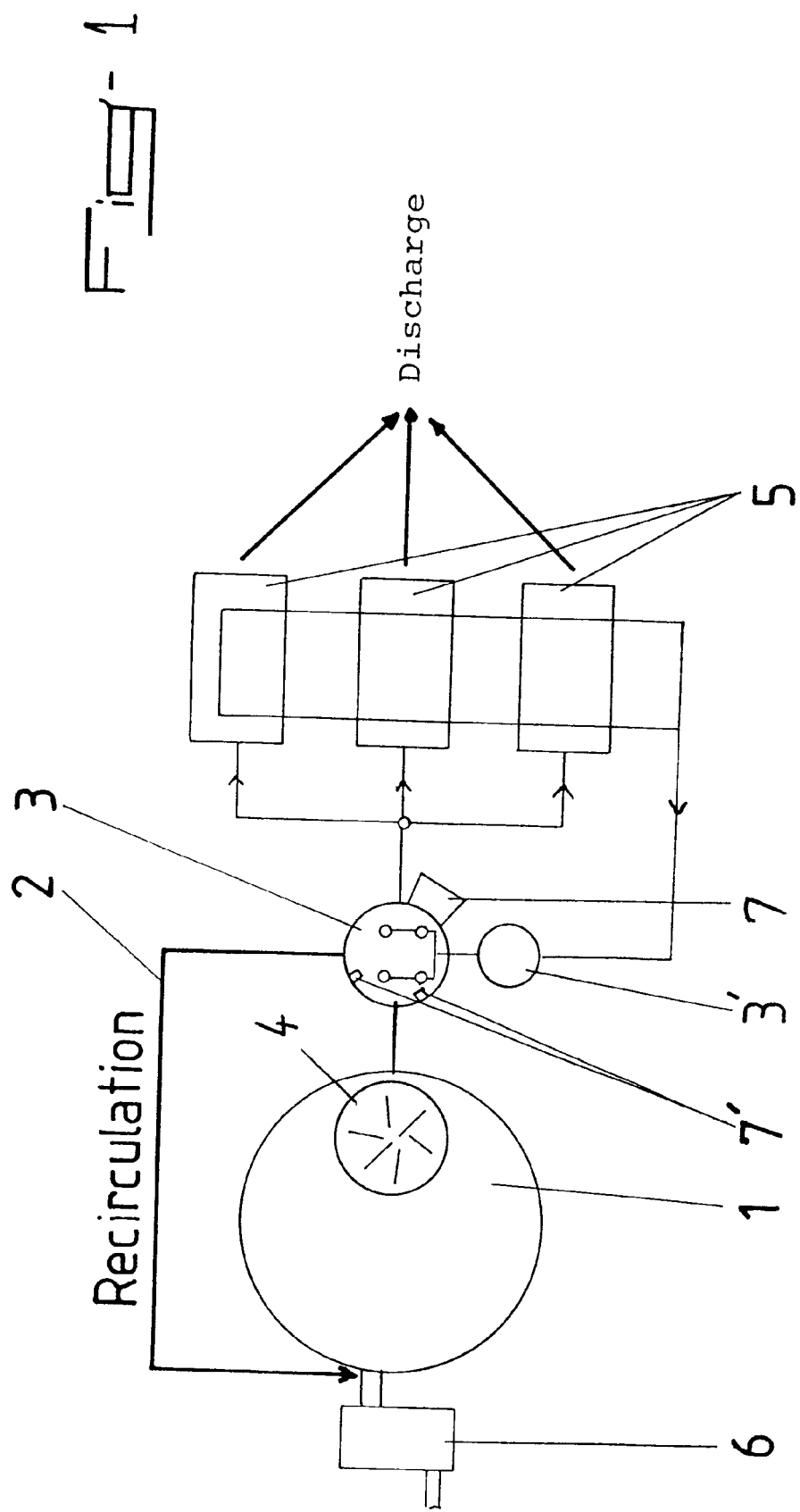
FIG. 1 is a schematic top plan view of an installation according to the invention.

The treatment process according to the invention consists principally, for each treatment cycle, in pouring the effluents to be treated, as produced, into a storage basin 1 and actuating a recirculation circuit 2 between this latter and a reactor 3 adapted particularly to oxygenate said effluents, in activating a superoxygenation device 4 integrated into the storage basin 1, when the volume of stored effluents is too great to avoid passing into an aerobic phase, this whilst maintaining the circulation through the reactor 3, then stopping the superoxygenation and maintaining the circulation at a minimum level avoiding the passage into anoxia of the effluents, when these latter meet certain minimum pollution conditions, in simultaneously and progressively pouring the effluents onto at least one purification solids unit 5 and removing the purified effluents, until leaving substantially only residual decantation sludge more or less mineralized in the storage basin 1, and, finally, treating as desired at least a portion of the latter sludge to suppress the organic components present and to lead to a substantially inert mineralized sludge.

The residual sludge is present after extraction of the liquid effluents comprised, on the one hand, decantable materials in suspension that are hardly biodegradable, and, on the other hand, biological sludges produced during the anaerobic purification process.

After stopping the superoxygenation device 4, these biological sludges slowly decant in the absence of oxygen and anaerobically mineralize, the degradable carbon transforming into gas and leaving progressively only the mineral compounds.

However, the density of these sludges is not uniform: from 150 grams per liter for those which rest on the bottom, they proceed to 20 grams per liter in the so-called "sludge cloud" at the liquid/sludge interface. The most highly mineralized sludges, which are the most inert, are the heaviest. The most biodegradable are the lightest, and are hence located at the surface.

The treatment of the residual sludges consists preferably in operating the superoxygenation device 4 and the recirculation circuit 2 substantially to the maximum of their capacity and to entrain the light component of the residual sludges, comprising the highest content of organic material, toward the superoxygenation region for its degradable and its mineralization in aerobic phase, so as to give a minimum quantity of residue constituted of mineralized sludges, which are heavy and inert.

The extraction of the sludges can be carried out, for their spreading, for example, at the end of summer which lends itself to their absorption by the soil.

The final inert sludges can also, as a function of the quantities produced and the capacity of the storage basin 1, remain stored in said basin for complete extraction and cleaning every five years, for example.

So as to eliminate the solid particles of large size and to limit the quantity of material to be decanted, it can also be provided that the effluents be subjected to screening or degrilling, if desired associated with decantation, before being pouring into the storage basin 1.

According to a preferred embodiment of the invention, the pouring of the effluents from the reactor 3 onto the purification solids 5 is carried out in a sequential manner, by transferring a portion of the contents of the reactor 3 toward said solids 5 at each cycle, when the pollution level of said portion is below a predetermined threshold value.

According to one characteristic of the invention, it can also be provided, particularly during the superoxygenation phase, to use the oxygenation reactor 3 for injecting products promoting purification into the storage basin 1 via the recirculation circuit 2 and for measuring and monitoring at least one parameter indicative of the pollution level, for example chemical and/or biological oxygen demand measured in the effluents, to determine the proper time to inject at least a portion of the contents of the reactor 3 onto the solids 5, when minimum pollution conditions are satisfied (such as a COD less than 1 g/l).

By way of example of injectable products promoting purification, can be particularly cited the silicone based products of the type known as RHODORSYL of the CRAY-VALLEY company, as well as different biologically active commercial preparations containing for example bacteria and/or yeast selected for their purification properties.

The reactor 3 thus permits carrying out for example measurements, if desired combined, of respirometry and/or of suspended materials, whilst serving to contain the decantation of the effluents before their pouring onto the purification solids 5.

The sequential operation of the reactor 3 (filling—treatment and decantation period—discharge of a portion of the contents onto the purification solids) permits controlling very precisely the development of the pollution level of the effluents and avoiding transferring these latter, or a portion of these latter, except when minimum pollution conditions are reached.

Thus, the purification solids 5 will be supplied sequentially with predetermined quantities of effluents suitable for the surface of said solids and whose pollution level permits optimum treatment by this latter, thereby guaranteeing minimum pollution at the level of the effluents finally discharged.

The recirculation of the effluents during the superoxygenation phase also permits homogenizing the effluents stored, by the generation of currents promoting mixing of these latter.

According to another characteristic of the invention, the purification solids 5 consist of one or several units of quantities of sand whose characteristics and dimensions are determined such that the limiting factor of the bacterial development in the solids will be lack of carbon and not lack of oxygen.

To promote this operation, the purification solids 5 can be subjected to vacuum, by application of suction within the body of sand so as to promote aeration of the surface layer 5' of the solids 5 receiving in the first instance the effluents from the reactor 3, carrying out an oxygenation of said solids 5 and a discharge of the gases produced.

Thus, when carbon becomes the limiting factor of the bacterial development, it is completely transformed by the aerobic bacteria into carbon dioxide and into various dissolved carbonates, which permits the process to guarantee the maintenance of a purification level meeting that required by regulations.

According to a preferred embodiment of the invention, particularly adapted for the treatment of wine-making effluents, each treatment cycle lasts substantially 365 days, this cycle time being subdivided time-wise into several consecutive periods corresponding to the different treatment operations, namely, for example, a first period of about 10 days, beginning with the grape harvest and corresponding to aerated storage of the effluents poured with recirculation and oxygenation, a second period of 40 to 110 days, preferably about 90 days, corresponding to the superoxygenation phase, a third period of 100 to 250 days, preferably about 200 days, corresponding to a minimum recirculation, to a decantation of the materials in suspension from the effluents stored in the basin 1 and to a progressive and sequential pouring of said liquid effluents onto the purification solids 5 from the reactor 3 after verification of the minimum pollution conditions and, finally, a fourth period of about 65 days corresponding to the mineralization of the residual sludges and, as the case may be, their removal from the storage basin 1.

Such a time frame permits on the one hand dimensioning the treatment installation and its components most accurately relative to the needs of the user (the most economical solution as to investment and cost of operation) and, on the other hand, to use to the maximum the natural processes (biochemical and biological reactions, decantation) for the purification of the effluents (limitation of external intervention into natural processes).

It should be noted that the first and most important point of pollution takes place during the first period mentioned, and corresponds to pouring the cleaning water produced during the grape harvest period.

This water is easily fermented and the autumn temperature promotes the development of microorganisms of the anabacterial type. This type of anaerobic bacteria produces bad smelling gases, particularly methyl mercaptan, hydrogen sulfide and methane.

So as to avoid any substantial odor-pollution, from the onset of storage, the path of recirculation between the reactor 3 and the storage basin 1 permits maintaining a level of oxidation permitting the appearance of bad odors.

Moreover, during the third mentioned period, beginning with the stopping of the superoxygenation device 4, the settled effluents contained in the storage basin 1 can decant under optimum conditions. Simultaneously, the dwell time of the effluents is extended in the reactor 3, permitting on the one hand new development of the purifying biomass, and on the other hand a maintenance of the effluent saturated in dissolved oxygen.

The present invention also has for its object an installation for the treatment of effluents loaded particularly with organic materials, and adapted particularly, but not in a limiting manner, to the practice of the treatment process described above.

This installation is principally constituted, as shown in FIG. 1 of the accompanying drawings, by at least one storage basin 1 adapted for the volume of effluents to be treated during a treatment cycle, at least one reactor 3 connected to the storage basin or basins 1 by a recirculation circuit 2, at least one superoxygenation device 4 disposed in the or each storage basin 1, and one or several units 5 of purification solids supplied with pretreated effluents from the reactor 3.

The storage and decantation basin 1 preferably has a shape facilitating the removal of residual sludges and rendering it adapted to receive a superoxygenation device 4 which permits, by supplying a suitable oxygen level, quickly bringing the biological pollution to an acceptable level for the final treatment in the purification solids 5 of the type of a body of sand.

So as to limit the size of the solid particles poured into the storage basin 1, the installation can comprise a screening or grilling station 6, as the case may be provided with a scraper, disposed upstream of the storage basin 1 and stopping for example the particles having a cross section greater than 1 cm$^2$.

According to one characteristics of the invention, the reactor 3 can be disposed within the storage basin 1, and can comprise a system for oxygenation by diffusion of fine bubbles and be provided with injection means for chemical and/or biological products promoting purification and means for analysis of the effluents, particularly as to their degree of pollution and/or oxygenation.

This biological reactor 3, preferably of vertical structure, is provided with a recirculation pump integrated into the recirculation circuit and with an injection pump for the effluents onto the purification body 5, adapted to be actuated sequentially for sequences of injection of effluents of several minutes per hour.

Said reactor 3 could for example consist of a reactor of the type of those produced by the company CALONA-PURFLO.

Preferably, the suction and reinjection of the effluents into the storage basin 1 by the recirculation circuit 2 are carried out respectively at two opposite ends of said basin 1 so as to create a flow or a current of effluents passing through this latter, substantially parallel to the current generated by the initial pouring of the effluents into said basin 1 and directed particularly toward the superoxygenation device 4.

The superoxygenator could itself consist for example of a superoxygenator of the type known as C3201 from the FLYGT company.

According to another characteristic of the invention, each unit of purification solids 5 comprises a layer of silica sand having a granulometry comprised between 2 mm and 6 mm, a coefficient of uniformity of 3.5 and a size determined such that the limiting factor of the bacterial development in the solids will be carbon deficiency.

The purification mass 5 will be dimensioned such that the sequential pouring of the effluents from the reactor 3 produces, in said body, a lower water layer at about 10 cm/m$^2$/day, preferably lower than 5 cm/m$^2$/day.

This body preferably has a thickness comprised between 30 and 80 cm, preferably about 60 cm.

The different units of purification body 5 form an assembly comprising a system for division of the effluents under pressure (expansion valve 8), which permits sprinkling and hence using all of the surface of the body, the purification body itself constituting the support of the biomass and formed of a layer of silica sand, and a system of recovery of purified effluents located at the base of the body and comprised by recovery drains 9 with a large slot permitting the partial recovery itself of the effluents to direct them toward the superficial hydraulic medium and permitting, as the case may be, the taking of specimens of analysis.

According to a supplemental characteristic of the invention, each unit of sand body 5 is subjected to underpressure by suction at the base of the unit 5 in question, this underpressure permitting replacing permanently the carbon dioxide of the biological respiration with a fresh supply of oxygen to promote a limitation of the bacterial development by carbon deficiency.

Figure 2:
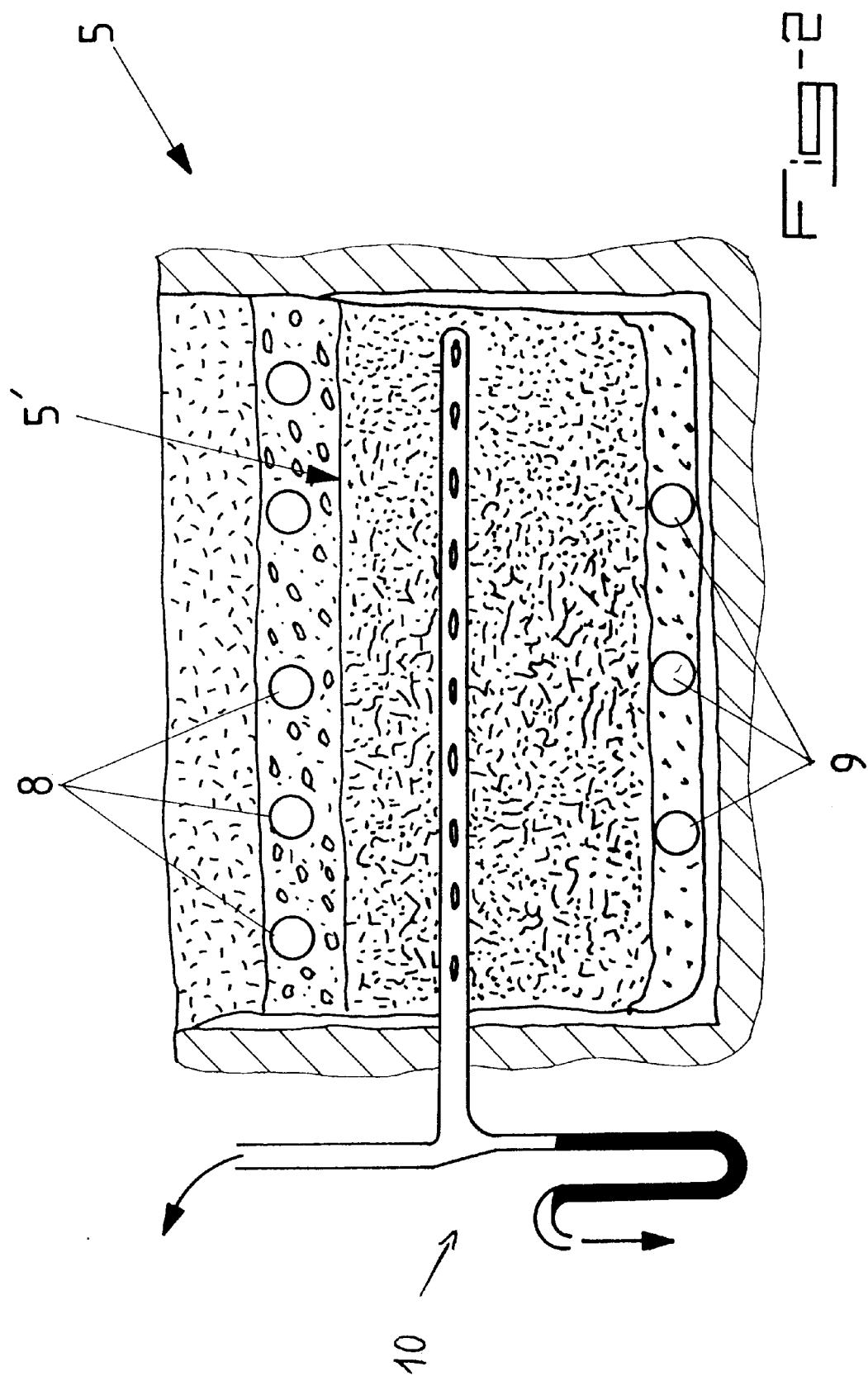
FIG. 2 is a detail cross-sectional view of a units of purification solids forming a part of the installation shown in FIG. 1.

As shown in FIGS. 1 and 2 of the accompanying drawings, the suction can be provided by connection to the compressor, supercharger or aerator 3' of the oxygenation system of the reactor 3, for example by means of a siphon device 10.

The installation according to the invention could also comprise at least one control and direction unit 7 of the process, for example of the programmable automatic type, which automatically controls the progression of the successive treatment cycles, being associated with detectors 7' and suitable actuators.

Of course, the invention is not limited to the embodiment described and shown in the accompanying drawings. Modifications remain possible, particularly as to the construction of the various elements or by substitution of technical equivalents, without thereby departing from the scope of protection of the invention.

What is claimed is:

1. A process for the treatment of effluents loaded with organic materials, comprising the steps of:

for each cycle of treatment, pouring the effluents to be treated, upon their production, into a storage basin and actuating a recirculation circuit between this latter and a reactor adapted to oxygenate said effluents, actuating a superoxygenation device integrated with the storage basin, when the volume of effluents stored is too great to avoid passing into anaerobic phase, this whilst maintaining the circulation by the reactor, then stopping the superoxygenation and maintaining the circulation at a minimum level to avoid passage into anoxia of the effluents, pouring the effluents onto at least one purification body and removing the purified effluents, so as to leave substantially only the residual decantation sludges at less partially mineralized in the storage basin, and, treating at least one portion of said sludges to remove organic components present and to lead to a substantially inert mineralized sludge.

2. Process according to claim 1, wherein the treatment of the residual sludges consists in operating the superoxygenation device (2) and the recirculation circuit (2) substantially at the maximum of their capacity and to drive a light component of the residual sludges, comprising the highest organic material content, toward the superoxygenation zone for its degradation and its mineralization in aerobic phase.

3. Process according to claim 1, wherein the pouring of the effluents of the reactor on the purification body is carried out in a progressive manner, by transferring portions of the contents of the reactor toward said body when the pollution level of said portions is below a predetermined threshold value.

4. Process according to claim 1, which further comprises using the oxygenation reactor to inject products promoting purification into the storage basin via the recirculation circuit and measuring and supervising at least one indicative parameter of the pollution level to determine the appropriate time to pour a portion of the contents of the reactor onto the body, when minimum pollution conditions are fulfilled.

5. Process according to claim 1, wherein the purification body consists in one or several bodies of sand, whose characteristics and dimensions are determined such that the limiting factor of bacterial development in the body will be lack of carbon.

6. Process according to claim 5, wherein the purification body is subjected to vacuum by application of suction within the body of sand, so as to promote aeration of the surface layer of the body first receiving the effluents from the reactor.

7. Process according to claim 1, wherein, for the treatment of wine-making effluents, each cycle of treatment lasts substantially 365 days, this cycle duration being subdivided time-wise into several consecutive periods corresponding to the different treatment operations, namely, a first period of about 10 days, beginning with the grape harvest and corresponding to aerated storage of the effluents poured with recirculation and oxygenation, a second period of 40 to 110 days corresponding to the superoxygenation phase, a third period of 100 to 250 days corresponding to a minimum recirculation, to a decantation of materials in suspension from the effluents stored in the basin and to a progressive and sequential pouring of said effluent liquids onto the purification body from the reactor after verification of the minimum pollution conditions and, finally, a fourth period of about 65 days corresponding to the mineralization of the residual sludges and to their discharge from the storage basin.

8. A process for the treatment of effluents loaded with organic materials, comprising the steps of:

for each cycle of treatment, pouring the effluents to be treated, upon their production, into a storage basin and actuating a recirculation circuit between this latter and a reactor adapted to oxygenate said effluents, actuating a superoxygenation device integrated with the storage basin, when the volume of effluents stored is too great to avoid passing into anaerobic phase, this whilst maintaining the circulation by the reactor, then stopping the superoxygenation and maintaining the circulation at a minimum level to avoid passage into anoxia of the effluents, pouring the effluents onto at least one purification body and removing the purified effluents, so as to leave substantially only the residual decantation sludges at less partially mineralized in the storage basin, and, treating at least one portion of said sludges to remove organic components present and to lead to a substantially inert mineralized sludge wherein the suction is carried out by connection to a compressor or an aerator of an oxygenation system of the reactor.

* * * * *